United States Patent [19]

Capuano

[11] 4,389,766
[45] Jun. 28, 1983

[54] METHOD OF MOUNTING A FASTENER

[75] Inventor: Terry D. Capuano, Hinckley, Ohio

[73] Assignee: The Lamson & Sessions Co., Cleveland, Ohio

[21] Appl. No.: 157,221

[22] Filed: Jun. 6, 1980

[51] Int. Cl.³ .............................................. B23P 11/00
[52] U.S. Cl. .................................... 29/432.2; 29/453; 29/520; 29/522 R; 411/179
[58] Field of Search ....................... 29/432, 798, 432.2, 29/432.1, 453, 520, 522 R; 411/179

[56] References Cited

U.S. PATENT DOCUMENTS

| 2,490,594 | 12/1949 | Madden | 29/432 X |
| 3,117,611 | 1/1964 | Matthews | 29/453 X |
| 3,273,234 | 9/1966 | Henchert | 29/453 |
| 3,276,499 | 10/1966 | Reusser | 29/520 X |
| 3,337,946 | 8/1967 | Anderson et al. | 29/432.1 |
| 3,339,705 | 9/1968 | Breed et al. | 29/432 X |
| 3,602,974 | 9/1971 | Koett | 29/432.1 X |
| 3,648,747 | 3/1972 | Steward | |
| 3,724,520 | 4/1973 | Ladouceur et al. | |
| 3,910,331 | 10/1975 | Randall | 29/453 |

FOREIGN PATENT DOCUMENTS

| 50094 | 2/1969 | Australia . |
| 1475265 | 5/1969 | Fed. Rep. of Germany . |
| 492137 | 6/1970 | Switzerland . |
| 1164472 | 9/1966 | United Kingdom . |

Primary Examiner—Charlie T. Moon
Attorney, Agent, or Firm—Yount & Tarolli

[57] ABSTRACT

An improved fastener includes a polygonal rim which cooperates with an axially projecting center section to define a recess in which sheet material is forced by a die to hold the fastener against rotational and axial movement relative to the sheet material. To improve the gripping action between the fastener and the sheet material, the sheet material is stretched by a tool which extends through the center of the fastener. When a hole is cut in the sheet material by the fastener, the pre-stretched metal resiliently contracts to grip the center section of the fastener. The gripping action between the sheet material and the fastener is further improved by resiliently compressing the center section of the fastener with the die. As the center section is withdrawn from the die, the center section springs outwardly to decrease the size of the recess and grip the sheet material. In addition, the rim is resiliently deflected radially outwardly by the die as metal is forced into the recess. When the die is withdrawn from the recess, the rim springs inwardly to decrease the size of the recess and grip the sheet material. The holding action between the fastener and the sheet material is increased by providing the recess with indentations which project into the rim and center section. The holding action is also increased by having the center section flare axially and radially outwardly.

22 Claims, 7 Drawing Figures

METHOD OF MOUNTING A FASTENER

BACKGROUND OF THE INVENTION

This invention relates to a fastener and the method by which it is mounted on a piece of sheet material.

A fastener has previously been mounted on sheet material by cutting away a portion of the sheet material with a center section of the fastener and forcing the sheet material into a recess formed in the fastener. Thus, U.S. Pat. Nos. 3,276,499; 3,337,946 and 3,724,520 disclose fasteners having center sections which are used to cut away a portion of a piece of sheet material. Dies are used to force the sheet material into recesses formed in these known fasteners.

Although known fasteners which are mounted in sheet material have been more or less satisfactory in their operation, difficulty has been encountered in holding these known fasteners against rotation and/or axial movement relative to a piece of sheet material on which they are mounted. Therefore when a cooperating fastening element engages the sheet material mounted fastener, the cooperating element may pull the mounted fastener out of the sheet material and/or may rotate the mounted fastener relative to the sheet material. This is especially true when one of the threaded elements has a locking feature.

SUMMARY OF THE PRESENT INVENTION

The present invention provides an improved fastener which is mounted on a piece of sheet material in an improved manner in order to increase the resistance of the fastener to loads which tend to rotate and/or move the fastener axially relative to the sheet material. The fastener includes a rim and a flared center section. When the improved fastener is to be mounted on sheet material, the center section cuts a hole in the sheet material. A die then forces the sheet material into a recess between the rim and the center section.

In order to increase the holding action between the fastener and the sheet material, the sheet material is resiliently deflected or stretched before the leading end of the fastener cuts a hole in the sheet material. After the hole has been cut in the sheet material by the leading end of the fastener, the resiliently deflected sheet material springs back to grip the center section of the fastener. It is preferred to resiliently deflect or stretch the sheet material by pressing against it with a tool which extends through the center of the fastener.

The holding action between the fastener and the sheet material is enhanced by resiliently compressing the center section of the fastener as the hole is cut in the sheet material. Thus, the die has a central opening which is slightly smaller than the initial cross sectional size of the center section of the fastener. As the center section of the fastener cuts through the sheet material and enters the opening in the die, the center section of the fastener is resiliently compressed inwardly by the die. The center section of the fastener is subsequently withdrawn from the die and resiliently expands outwardly to decrease the size of the recess and grip the sheet material. It should be noted that this results in a gripping action between the sheet material and fastener due to both the radially inward spring back of the resiliently prestretched sheet material and the radially outward spring back of the resiliently compressed center section of the fastener.

In addition, the gripping action between the fastener and the sheet material is increased by resiliently deflecting the rim of the fastener as the sheet material is forced into the recess in the fastener. Thus, the die forces the rim of the fastener radially outward as the sheet material is forced into the recess in the head of the fastener by the die. When the fastener is withdrawn from the die, the rim springs back towards the center section of the fastener to reduce the size of the recess and press the sheet material in the recess firmly against the center section of the fastener.

Further gripping action is obtained between the fastener and the sheet material by retaining the sheet material in indentations formed in both the rim and the center section of the fastener. Thus, the recess in the fastener is provided with radially outwardly projecting indentations which extend into the rim of the fastener and radially inwardly projecting indentations which extend into the center section of the fastener. Additional holding action is obtained between the fastener and the sheet material by providing the center section with an axially outwardly flaring side surface.

Accordingly, it is an object of this invention to provide a new and improved fastener and method for mounting the fastener and wherein a secure gripping action is obtained between the fastener and a piece of sheet material due to one or more of a plurality of factors including prestretching of the sheet material so that it will spring back toward a center section of the fastener, compressing a center section of the fastener so that it will spring outwardly toward a rim of the fastener, and expanding the rim of the fastener so that it will spring inwardly toward the center section of the fastener.

Another object of this invention is to provide a new and improved method of mounting a fastener on a piece of sheet material by stretching the sheet material independently of forces transmitted from the fastener to the sheet material prior to cutting away and portion of the sheet material with the fastener to promote a springing back of the sheet material against a portion of the fastener.

Another object of this invention is to provide a new and improved method of mounting a fastener on a piece of sheet material and wherein the cross sectional size of a center section of the fastener is decreased as the fastener moves into an opening in a die so that the center section of the fastener will expand as it is removed from the die.

Another object of this invention is to provide a new and improved method of mounting a fastener on a piece of sheet material and wherein a rim of the fastener is expanded outwardly by a die so that the rim will subsequently contract.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

Fastener—General

Figure 1:
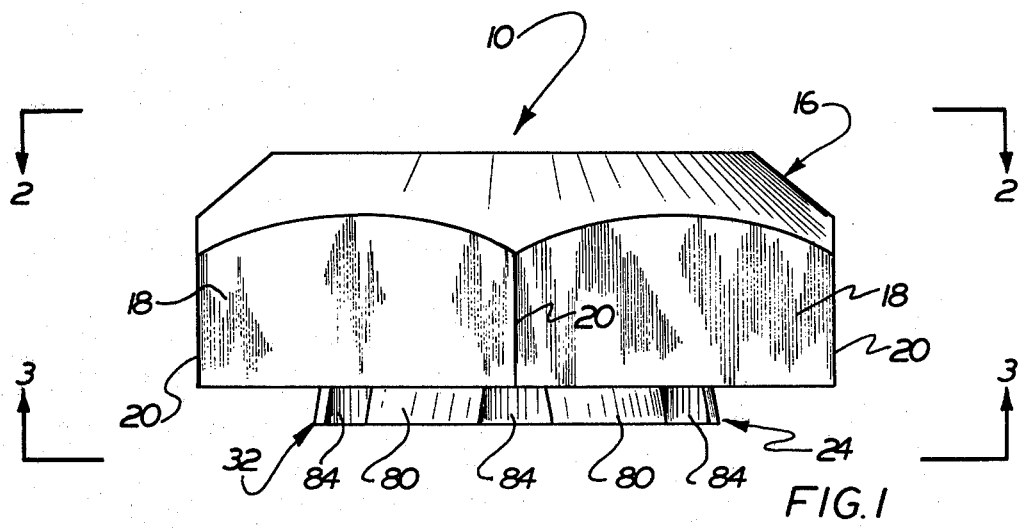
FIG. 1 is an elevational view of a fastener constructed in accordance with the present invention.
Figure 2:
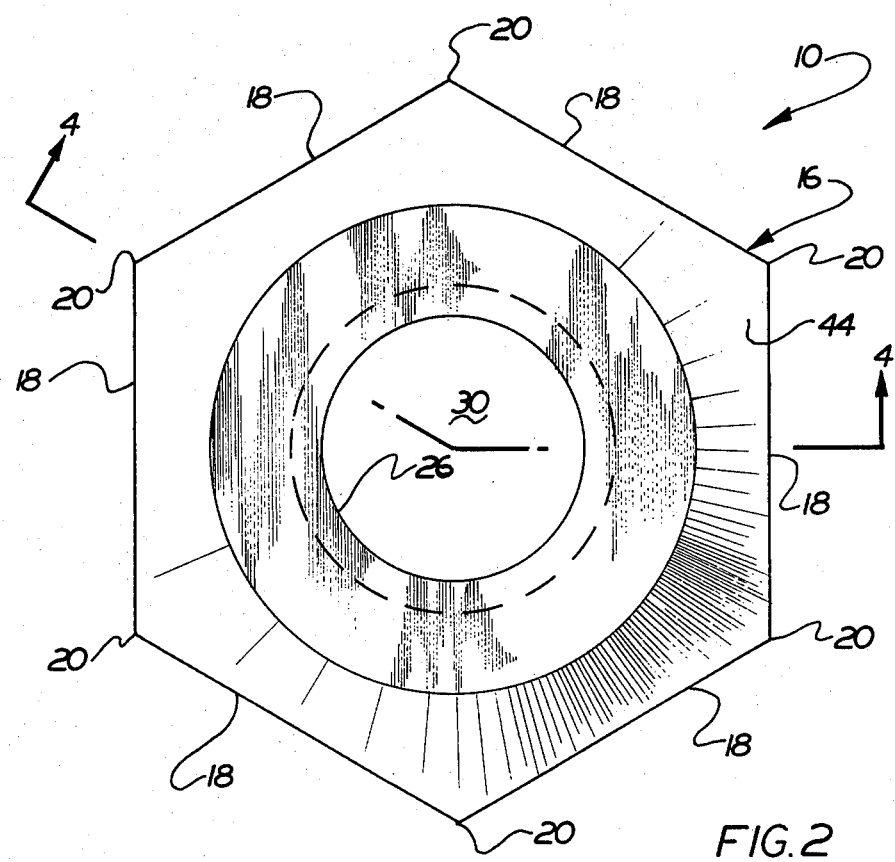
FIG. 2 is a top plan view, taken generally along the line 2—2 of FIG. 1, illustrating the configuration of a head section of the fastener.
Figure 4:
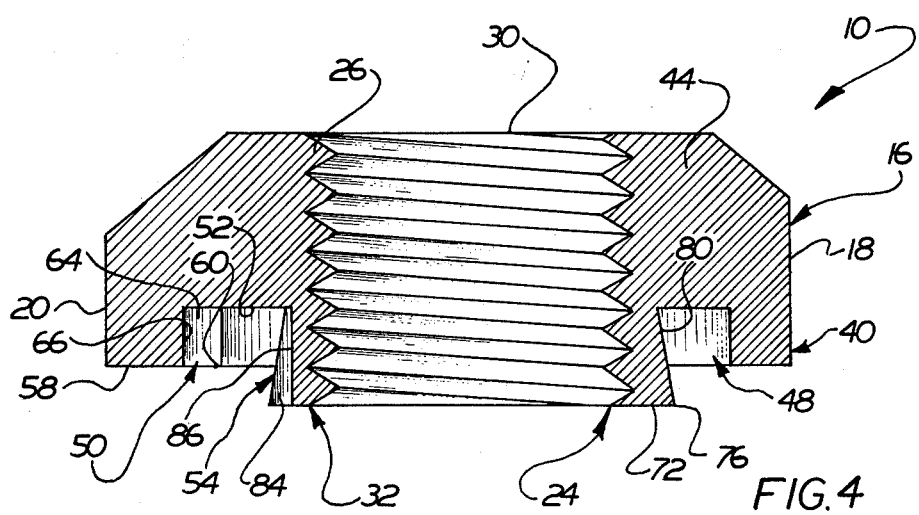
FIG. 4 is a sectional view, taken generally along the line 4—4 of FIG. 2, further illustrating the relationship between the recess, rim and center section of the fastener.
Figure 5:
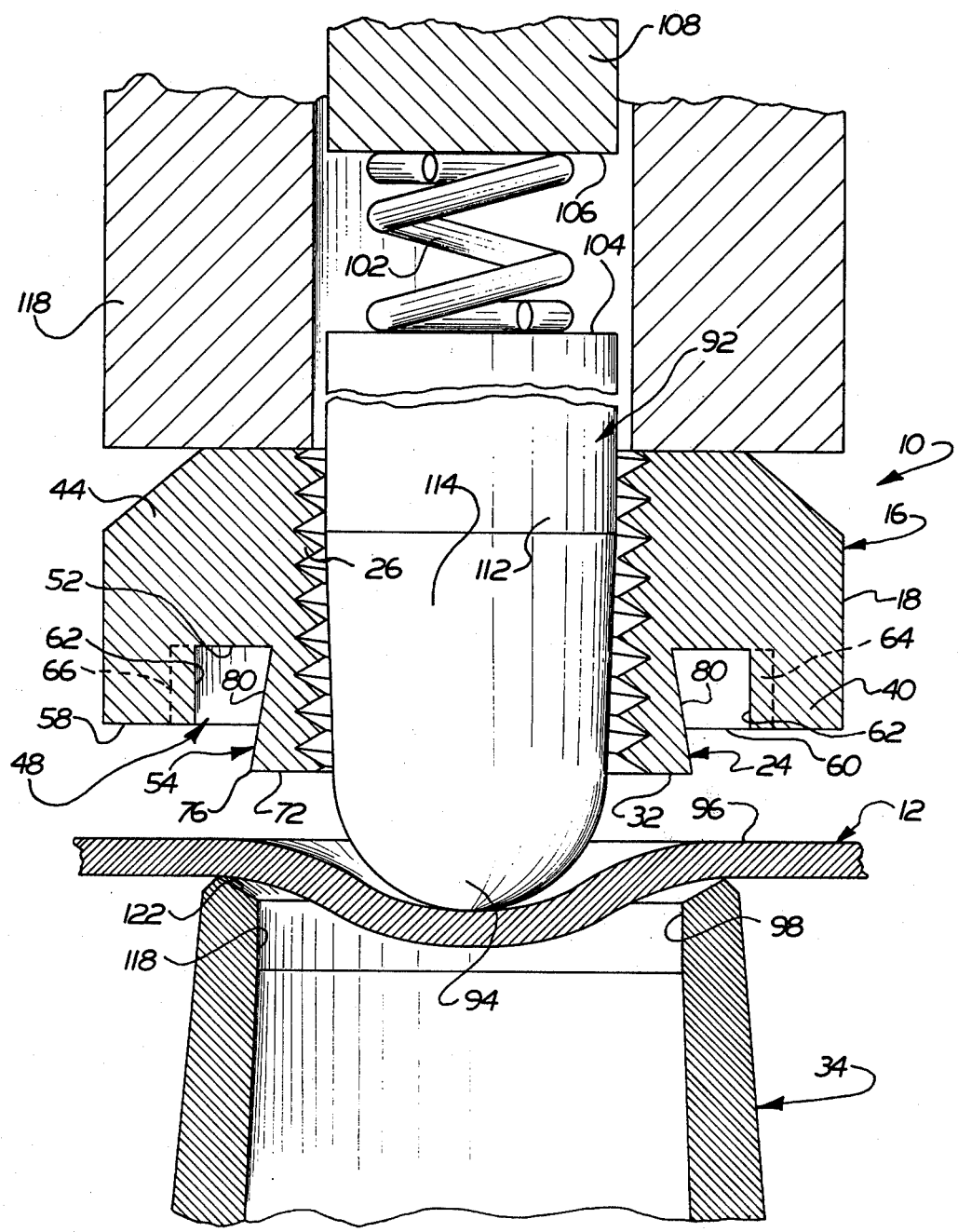
FIG. 5 is a schematicized sectional view illustrating the manner in which a piece of sheet material is stretched prior to mounting of the fastener of FIGS. 1-4 on the sheet material.
Figure 6:
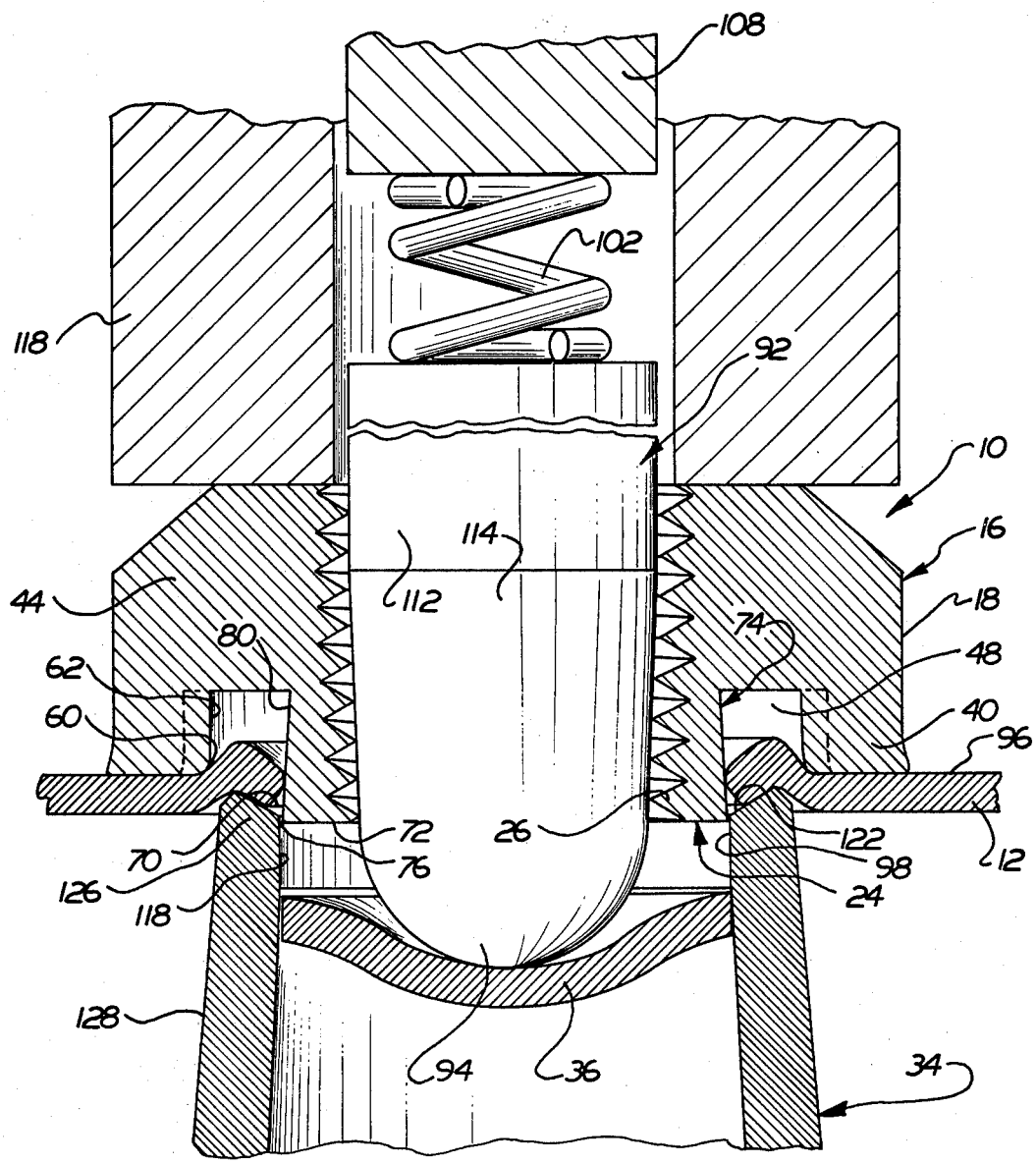
FIG. 6 is a schematicized view, generally similar to FIG. 5, illustrating the manner in which a center section of the fastener is resiliently compressed by a die.
Figure 7:
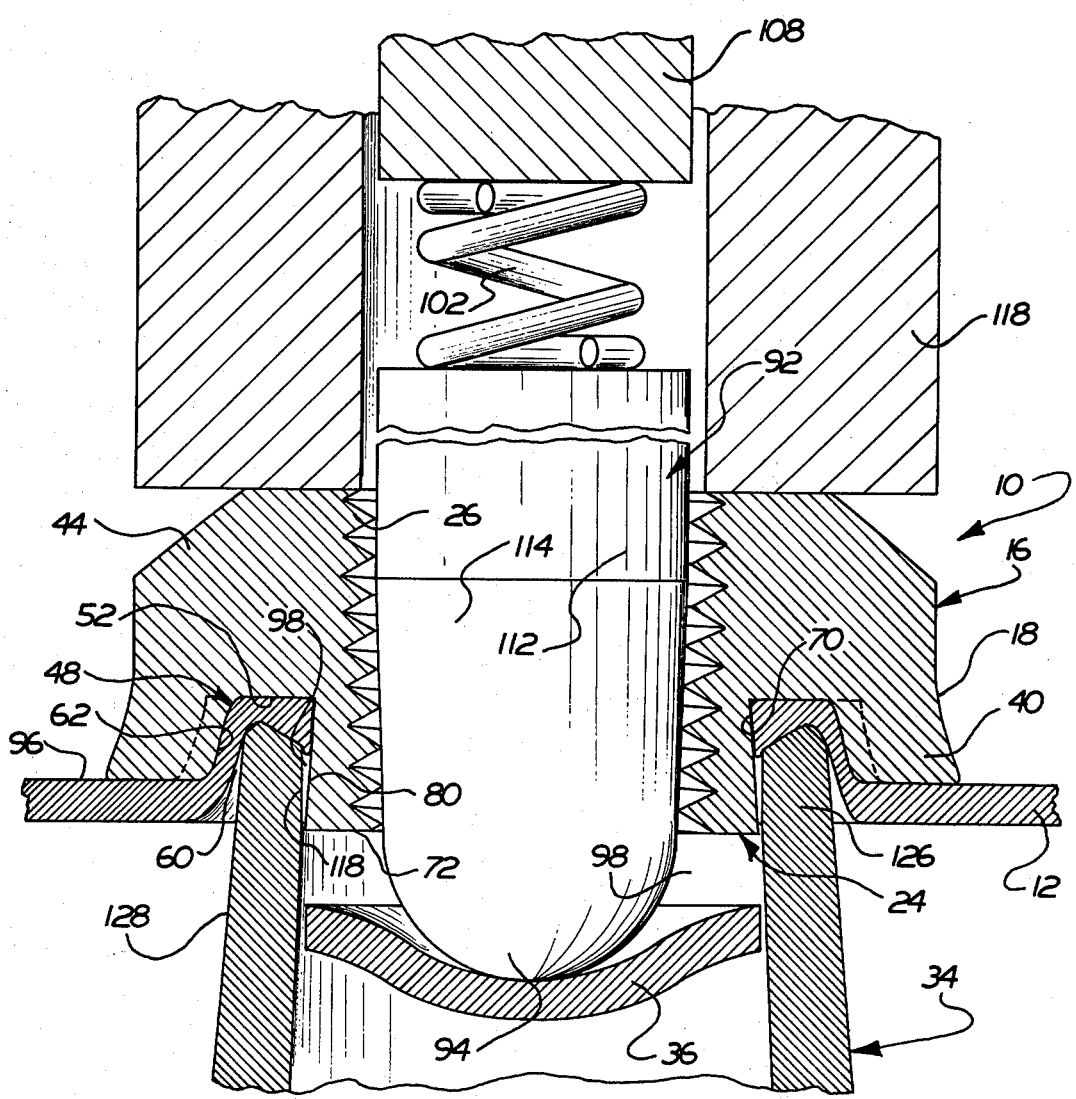
FIG. 7 is a schematicized sectional view, generally similar to FIG. 6, illustrating the manner in which the rim of the fastener is resiliently deflected outwardly as the sheet material is forced into the recess by the die.

A fastener 10 (see FIGS. 1-4) constructed in accordance with the present invention is mounted on a sheet 12 of metal or other suitable material in the manner illustrated in FIGS. 5-7. The fastener 10 has a polygonal head 16 (see FIGS. 1 and 2) with flat side surfaces 18 which intersect at corners 20. A center or shank section 24 extends axially outwardly from the center of the head section 16 (see FIGS. 3 and 4). An internal thread convolution 26 is formed on the inside of an opening 30 extending through the head and center sections 16 and 24 (FIG. 4). Although an internal thread convolution 26 has been shown, the fastener 10 could have an external thread convolution if desired.

When the fastener 10 is to be mounted on the sheet material 12 (FIG. 5), a leading end portion 32 of the center section 24 cooperates with a hardened die 34 to cut a generally circular piece 36 (FIG. 6) from the sheet material 12. Once the fastener 10 has been mounted on the sheet material 12, the center section 24 and head section 16 cooperate to grip the sheet material and hold the fastener against both axial and rotational movement relative to the sheet material. Although it is contemplated that other types of fasteners may be utilized, in the present instance, the fastener 10 is a pierce and clinch nut having the internal thread convolution 26 which is engaged by a bolt or similarly externally threaded member. It is also contemplated that the opening 30 could be untapped and used with a self-tapping bolt.

An improved holding action between the fastener 10 and sheet material 12 is obtained by a combination of factors including prestretching the sheet material (FIG. 5) to enable it to contract against the center section, resiliently contracting the center section 24 of the fastener (FIG. 6) to enable the center section to expand radially outwardly against the sheet material, and resiliently expanding a rim 40 on the head section 16 radially outwardly (FIG. 7) to enable the rim to contract against the sheet material. In one specific instance, the holding action between one specific fastener 10 and a sheet 12 formed of metal was so strong that a bolt having a tensile strength of over 180,000 psi broke under the influence of a torque load without rotation of the fastener relative to the sheet material. Of course, the torque load which the fastener 10 can withstand will vary depending upon the characteristics of the nut and/or sheet material.

Fastener—Head Section

The head section 16 of the fastener includes a hexagonal base 44 (see FIGS. 2 and 4) and rim 40 which extends axially downwardly (as viewed in FIG. 4) from the base 44. The hexagonal rim 40 circumscribes and is coaxial with the circular center section 24 of the fastener 10. The rim 40 cooperates with the center section 24 to define a generally annular recess 48 (see FIGS. 3 and 4) which circumscribes the center section 24.

The recess 48 is defined by a group 54 of inner side surfaces on the rim 48, by a flat circular bottom surface 52 on the base 44 and by a group 54 of outer side surfaces on the center section 24. The recess 48 has an axial depth which is greater than the thickness of the sheet material 12 (FIG. 6). The depth of the recess 48 is measured from a flat bottom surface 58 of the rim 40 (FIG. 4) and the parallel bottom surfaces 52 on the base 44 of the head 16. The recess 48 has a circular opening 60 (FIGS. 3 and 4) which faces downwardly (as viewed in FIGS. 4-7).

Figure 3:
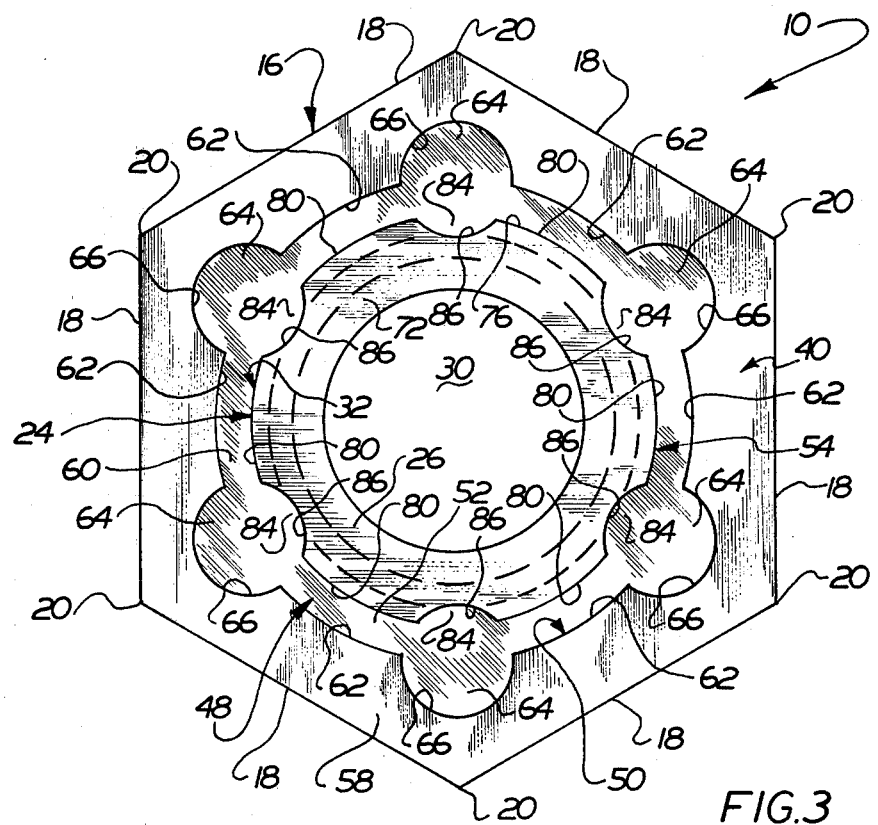
FIG. 3 is a bottom plan view, taken generally along the line 3—3 of FIG. 1, illustrating the configuration of a recess formed between a rim of the head section and an axially extending center section of the fastener.

The group 50 of side surfaces on the inside of the rim 40 includes a circular array of axially extending arcuate surfaces 62 (FIG. 3). The circular array of arcuate surfaces 62 has its center on the coincident central axes of the center section 24 and the thread convolution 26. Each of the arcuate surfaces 62 has a center which is coincident with the center of circular array.

The group 50 of side surfaces of the rim 40 also includes arcuate surfaces 66 (FIG. 3) which form indentations 64 projecting radially outwardly from the circular array of arcuate surfaces 62. Each of the indentation surfaces 66 extends radially outwardly from the ends of a pair of adjacent arcuate side surfaces 62. Each of the indentation surfaces 66 defines a portion of a cylinder having a central axis extending parallel to the central axis of the center section 24 and opening 30. The bottom of each indentation 64 is defined by the flat surface 52 (see FIG. 4).

The indentations 64 are aligned with the corners 20 of the rim 40 to reduce the stiffness of the rim and to enable it to be flexed radially outwardly. Thus, the side surfaces 66 (see FIG. 3) of the indentations 64 from portions of cylinders which have central axes which intersect radial lines extending between the central axis of the fastener 10 and the corners 20. The central axes of the side surfaces 66 are disposed equal distances radially outwardly of the circular array of arcuate side surfaces 62. By reducing the amount of metal in the rim 18 between the circular array of arcuate side surfaces 62 and the corners 20 of the hexagonal rim 40, the indentations 64 reduce the flexural rigidity or stiffness of the rim. This enables the rim 40 to be resiliently deflected outwardly in the manner shown in FIG. 7 as metal is forced into the recess 48 by the die 34.

Although the rim 40 has been described as having a particular configuration, it is contemplated that it could have a configuration other than the specific configuration disclosed. Thus, the shape of the indentations 64 could be changed from the illustrated configuration in which the side surfaces 66 form a portion of a cylinder. In addition, the configuration of the outer side of the rim 40 could be varied from the hexagonal configuration illustrated in the drawings.

It is also contemplated that the flat lower or bottom side surface 58 of the rim 40 could be provided with axially projecting teeth or prongs which would indent the sheet material 12 to further hold the nut body 16 against rotation relative to the sheet material. Although these axially extending teeth or prongs could have many different configurations, it is contemplated that they could be pointed or have a radially and axially tapered configuration similar to the configuration of the teeth or spring fingers disclosed in application Ser. No. 26,889, filed Apr. 4, 1979 by Terry D. Capuano and entitled "Fastener". The projections or spring fingers could be advantageously mounted in pairs and provided with side surfaces which would cause the spring fingers to hook into the sheet material 12 during mounting of the fastener 10 so that the spring fingers could resist both axial and rotational movement of the fastener 10 relative to the sheet material. In order to compensate for the surface hardness of the sheet material, the projections may be relatively blunt.

Fastener—Center Section

The center section 24 on the fastener 10 performs the dual functions of cutting a hole 70 (see FIG. 6) in the sheet material 12 and holding the fastener against movement relative to the sheet material. The center section 24 has a generally frustoconical cross sectional configuration (see FIG. 4) and extends axially outwardly from and is coaxial with the head section 16. Thus, the center section 24 has a relatively small annular cross sectional configuration adjacent to the surface 52 of the base 44 and a relatively large annular cross sectional configuration at an axially outer end surface 72 on the leading end portion 32. The end surface 72 cooperates with an axially outwardly flaring outer side surface 54 of the center section 24 to define a generally circular cutting edge 76 which cooperates with the die 34 (see FIG. 5) to cut or shear a substantially circular piece 36 from the sheet material 12 to form the hole 70.

The outer side surface 54 on the center section 24 includes a plurality of arcuate surfaces 80 which are disposed in a circular array (see FIG. 3) having a center which is disposed on the longitudinal central axis of the fastener 10. The center of curvature of each of the arcuate surfaces is disposed on the central axis of the fastener 10. The arcuate segments 80 taper inwardly from the relatively large diameter outer end surface 72 of the center section 24 to the base 44 of the head section 16 (see FIG. 4). This results in the center section 24 forming the frustrum of a cone having a central axis which is coincident with the longitudinal central axis of the thread convolution 26 and base 44 of the head section 16.

In addition to the arcuate segments 80, the outer side surface 54 on the center section 24 includes a plurality of indentations 84 (see FIG. 3) which projects radially inwardly from the circular array of arcuate segments 80. The indentations 84 have arcuate inner side surfaces 86 which form portions of the same cylinders as do the side surfaces 66 of the indentations 64 in the rim 40. Therefore, the arcuate indentations 84 are aligned with the indentations 64 in the rim and have centers of curvature which are common with the centers of curvature of the side surfaces 66 of the indentations 64.

The radial depth and circumferential width of the recesses 84 increase as the recesses extend axially outwardly away from the base 44 of the head section 16 (see FIG. 4). This is because the central axes of the cylinders formed by the arcuate indentation surfaces 66 in the rim 40 and the arcuate indentation surfaces 86 in the center section 24 extend parallel to the central axis of the fastener 10 and the arcuate outer side surfaces 80 of the center section 24 flare axially outwardly. A flat bottom surface 52 on the lower side (as viewed in FIG. 4) of the base 44 on the head section 16 defines the axially innermost ends of the recesses 84.

Although the surfaces 86 of the indentations 84 in the center section 24 have a common central axis with the surfaces 66 of the indentations 64 in the rim 40, the arcuate surfaces 80 on the outside of the inner section 24 extend transversely to the arcuate surfaces 62 on the inside of the rim 40. The arcuate surfaces 62 on the inside of the rim 40 form a portion of a cylindrical surface having a central axis which is coincident with the central axis of the fastener 10. The arcuate surfaces 80 on the outside of the center section 24 form a portion of a cone having a central axis which is coincident with the central axis of the fastener 10.

The radially inwardly projecting indentations 84 in the center section 24 reduce the flexural rigidity or stiffness of the center section 24. Thus, the indentations 84 reduce the thickness of the wall of the center section 24 at locations radially inwardly from the indentations. This enables the center section 24 to be compressed radially inwardly by the die 34 as the piece 36 is cut from the sheet material 12 (see FIGS. 5 and 6). In order to facilitate the cutting of the hole 70 in the sheet material 12 (FIG. 6), the center section 24 extends axially outwardly from the rim 40 for a distance which is approximately as great as the thickness of the sheet material 12.

Although the center section 24 has been disclosed as having a particular configuration, it is contemplated that the center section could have other configurations. For example, the leading end surface 72 of the center section could be rounded. However, rounding the leading end of the center section would tend to impair the efficiency of the corner 76 (see FIG. 4) as a cutting edge. Therefore, it is preferred to have a flat outer end surface 72 on the center section 24 to provide a sharply defined generally circular cutting edge 76. In addition, it is contemplated that the recesses 84 could have a configuration other than the arcuate configuration shown in FIG. 3.

Method of Mounting the Fastener

When the fastener 10 is to be mounted on a sheet 12 of metal or other material, the sheet material is resiliently stretched over the die 34 (see FIG. 5) before any force is applied against the sheet material by the fastener 10 to cut a hole in the sheet material. To stretch the sheet material 12 over the die 34 (FIG. 5), a generally cylindrical tool 92 extends through the opening 30 in the center of the fastener 10. The tool 92 has a hemispherical nose or leading end section 94 which engages the upper side surface 96 of the sheet material 12 and forces the sheet material downwardly into a circular opening 98 formed in the upper (as viewed in FIG. 5) end portion of the die 34.

As the sheet material 12 is pressed downwardly into the die opening 98 by the tool 92, the sheet material 12 is resiliently deflected or stretched independently of any force transmitted from the fastener 10 to the sheet material. Although the prestretching of the sheet material is advantageously done with the tool 92 which extends through the center of the fastener 10, it is contemplated that if desired the metal could be prestretched in other ways.

The tool 92 is pressed downwardly against the upper side surface 96 of the sheet material 12 with a predetermined force by a biasing spring 102. The biasing spring 102 engages a circular upper end surface 104 of the tool 92 and a circular end surface 106 of a ram 108. Therefore, as the nose or leading end portion 94 of the tool 92 is pressed against the sheet 12, the spring 102 is compressed until a predetermined force is applied against the sheet material. Once the spring 102 has been compressed to initially apply the predetermined stretching force against the sheet material, the force remains substantially constant during further downward movement of the ram 108. This enables the extent of deflection of the sheet material into the die 34 to be controlled during the repeated mounting of fasteners on pieces of sheet material.

The sheet material 12 is deflected independently of the fastener 10 under the influence of only forces applied against the sheet material by the tool 92. Thus, the tool 92 is freely movable axially through the internally threaded central opening in the fastener 10. The tool 92 advantageously has a cylindrical end portion 112 which engages the crest of the thread convolution 26 to accurately locate the fastener 10 relative to the tool. The lower or leading end portion 114 of the tool 92 tapers slightly inwardly from the cylindrical base 112 to enable the center section 24 to be resiliently deflected inwardly from the free or initial condition of FIG. 5 to the compressed condition of FIG. 6 by the die 34.

After the sheet material 12 has been prestretched, the fastener 10 is pressed downwardly through the sheet material to cut away the piece 36 and form the circular opening 70 in the sheet material. A ram 118 which is coaxial with and circumscribes the tool 92 presses the fastener 10 downwardly against the sheet material 12. As the fastener 10 is moved downwardly against the prestretched sheet material 12, the tool 92 maintains a constant tension in the portion of the sheet material which is stretched over the open end of the die 34 (see FIG. 5). It should be noted that although the sheet 12 could be formed of other materials, the sheet is preferably metal.

As the ram 118 continues to move downwardly, the center section 24 of the fastener 10 is forced through the sheet material 12 into the die 34 with a punching action. As this occurs, the sheet material 12 is sheared (FIG. 6) between the die 34 an the corner 76 on the leading end of the center section 24. It should be noted that the blank 36 will have indentations corresponding to the indentations 84 and that the sheet 12 will have projections which extend into the indentations. As the generally circular blank 36 is cut out of the sheet material 12 by the shearing action, the stretching action of the sheet 12 is terminated since the tool 92 is ineffective to apply a force to the sheet material.

Once the hole 70 has been cut in the sheet material 12 and the stretching of the material terminated, the material tends to spring back into tight engagement with the center section 24 (see FIG. 6). Thus, when the hole 70 is being cut in the sheet material 12, the material is resiliently stretched by the tool 92. Since the hole 70 is cut by the center section 24, the hole has a configuration which corresponds to the cross sectional configuration of the center section.

After the hole 70 is initially cut, the metal or other suitable material resiliently springs radially inwardly against the outer side surface 54 on the center section 24. The resilient spring back of the material 12 into tight engagement with the center section 24 is increased by a relatively small amount of resilient deflection which occurs when the material is sheared between the leading end section 24 of the fastener 10 and the die 34. This spring back results in the sheet material surface defining the hole 70 pressing into firm abutting engagement with the arcuate segments 80 and the arcuate surfaces defining the recesses 84 of the center section 24.

In order to increase the holding action between the center section 24 of the fastener 10 and the sheet material 12, the center section 24 of the fastener is resiliently compressed radially inwardly by the die 34 as the blank 36 is cut from the die. The die 34 has a cylindrical inner surface 118 which defines the opening 98 and has a diameter which is less than the initial or unrestrained diameter of the center section 24 of the fastener 10 (see FIG. 5). As the center section 24 of the fastener is forced downwardly through the sheet material 12 and into the die 34 (see FIG. 6), the center section 24 of the fastener 10 is resiliently compressed radially inwardly toward the tool 92.

To accommodate this radially inward deflection of the center section 24 of the die, the section 114 of the tool 92 is tapered. The die 34 is hardened and the fastener 10 is formed of a nonhardened and relatively ductile metal. Therefore, the center section 24 is resiliently compressed to reduce the extent to which it flares axially outwardly from the base 44 of the head section 16 with relatively little wearing of the die 34.

To promote inward compression of the center section 24, the die 34 has a frustoconical upper side surface 122 which tends to cause the center section 24 to be cammed inwardly as the ram 118 moves the fastener 10 from the position shown in FIG. 5 to the position shown in FIG. 6. As the center section 24 is compressed radially inwardly, the center section flexes at the relatively weak areas formed by the indentations 84. The arcuate surfaces 80 are disposed on relatively stiff segments of the wall of the center section 24. Therefore, the stiff wall segments on which the surfaces 80 (FIG. 3) are disposed move inwardly as the wall flexes at the indentations 84. This reduces the outside diameter of the frustoconical center section 24 and the root diameter of the portion of the thread convolution 26 in the center section 24.

Continued downward movement of the ram 118 causes a circular upper end 126 of the die 34 to enter the recess 48 (FIGS. 6 and 7) formed between the rim 40 and center section 24 of the fastener 10. An axially tapered outer side surface 128 of the side 34 has a diameter which is only slightly smaller than the inside diameter of the circular array of arcuate segments 82 on the inside of the rim 44 (see FIG. 3). However, the diameter of the circular array of segments 62 on the inside of the rim 44 is smaller than the diameter of the die 34 plus twice the thickness of the sheet material 12. Therefore, when the die 34 is forced into the recess 48 with the sheet material overlapping opposite sides of the die in the manner shown in FIG. 7, the rim 40 cooperates with the upper end of the die 34 to reduce the thickness of the sheet material at a location between the outer side surface 128 of the die 34 and the rim.

Reducing the thickness of the sheet material 12 at a location between the outer side surface 128 of the die 34 and the rim 40 provides metal to fill the recess 48 axially inwardly of the outer end 72 of the flaring center section 24 (FIG. 7). Thus as the fastener 10 moves from the position shown in FIG. 6 to the position shown in FIG.

7, the rim 40 and die 34 cause metal to plastically flow into the recess 48 with a wiping action. This results in the volume of metal being forced into the bottom of the recess 48 being increased as the die 34 enters the recess.

The relatively large combined diameter of the die 34 and the sheet material 12 results in substantial radially outwardly directed forces being applied against the rim 40. These radially outwardly directed forces cause the rim 40 to be deflected from the position shown in FIG. 5 through the position shown in FIG. 6 to the position shown in FIG. 7. The outward deflection of the rim 40 of the fastener 10 is facilitated by the recesses 64 which extend toward the corners 20 of the polygonal head end 16 of the fastener (see FIG. 3). Therefore, as the sheet material 12 is forced into the recess 48 by the die 34 (FIG. 7), the center section 24 is resiliently flexed or compressed radially inwardly and the rim 40 is resiliently flexed or expanded radially outwardly.

As the sheet material 12 is forced into the recess 48 (see FIGS. 6 and 7), the sheet material is forced into the radially outwardly projecting indentations 64 in the rim 40 and into the radially inwardly projecting indentations 84 in the center section 24. The sheet material 12 fills the rim indentations 64 throughout their axial extent. In addition, the sheet material fills the center section indentations 84 throughout a majority of their axial extend. Of course, the extent to which the center section indentations 84 are filled will vary with variations in the thickness of the sheet material and the axial extent of the center section.

After the sheet material 12 has been forced into the recess 48 in the manner illustrated in FIG. 7, the die 34 and fastener 10 are separated. As the die 34 moves out of the recess 48, the rim 40 resiliently springs back toward its initial position (see FIG. 5). As this occurs, the size of the recess 48 is reduced and the sheet material in the recess is pressed firmly against the center section 24.

As the center section of the fastener 10 is subsequently withdrawn from the die 34, the center section expands radially outwardly from the compressed condition shown in FIG. 7 toward the free or unrestrained condition shown in FIG. 5. As this occurs, the size of the recess 48 is further reduced. Therefore the metal in the recess 48 is further compressed between the rim 40 and the center section to provide a secure locking action. It should be noted that the root diameter of the portion of the internal thread convolution in the center section 24 increases as the center section is withdrawn from the die 24.

Once the fastener 10 has been removed from the die 34, the fastener 10 is securely held against rotation relative to the sheet material 12 by gripping the sheet material between the rim 40 and center section 24. This gripping action is promoted by the indentations 64 in the rim 40 and the indentations 84 in the center section 24. The fastener 10 is held against axial movement by the sheet material wedged into the recess 48 inwardly of the axially and radially outwardly flaring center section 24.

SUMMARY

In view of the foregoing, it is apparent that the present invention provides an improved fastener 10 which is mounted on a piece of sheet material 12 in an improved manner in order to increase the resistance of the fastener to loads which tend to rotate and/or move the fastener axially relative to the sheet material. The fastener 10 includes a rim 40 and a flared center section 24. When the improved fastener 10 is to be mounted on sheet material 12, the center section 24 cuts a hole 70 in the sheet material. A die 34 then forces the sheet material into a recess 48 between the rim 40 and the center section 24.

In order to increase the holding action between the fastener 10 and the sheet material 12, the sheet material is resiliently deflected or stretched before the leading end 76 of the fastener cuts a hole 70 in the sheet material. After the hole 70 has been cut in the sheet material 12 by the leading end of the fastener, the resiliently deflected sheet material springs back to grip the center section 24 of the fastener. It is preferred to resiliently deflect or stretch the sheet material by pressing against it with a tool 92 which extends through the center of the fastener.

The holding action between the fastener 10 and the sheet material 12 is enhanced by resiliently compressing the center section 24 of the fastener 10 as the hole 70 is cut in the sheet material. Thus, the die 34 has a central opening 98 which is slightly smaller than the initial cross sectional size of the center section 24 of the fastener (FIG. 5). As the center section 24 of the fastener cuts through the sheet material 12 and enters the opening 98 in the die 34 (FIG. 6), the center section 24 of the fastener 10 is resiliently compressed inwardly by the die 34. The center section 24 of the fastener 10 is subsequently withdrawn from the die 34 and resiliently expands outwardly to decrease the size of the recess 48 and grip the sheet material 12. It should be noted that this results in a gripping action between the sheet material 12 and fastener 10 due to both the radially inward spring back of the resiliently prestretched sheet material 12 and the radially outward spring back of the resiliently compressed center section 24 of the fastener.

In addition, the gripping action between the fastener 10 and the sheet material 12 is increased by resiliently deflecting the rim 40 of the fastener as the sheet material is forced into the recess 48 in the fastener. Thus, the die 34 forces the rim 40 of the fastener radially outward as the sheet material 12 is forced into the recess 48 in the head 16 of the fastener by the die. When the fastener 10 is withdrawn from the die 34, the rim 40 springs back towards the center section 24 of the fastener to press the sheet material in the recess 48 firmly against the center section 24 of the fastener.

Further gripping action is obtained between the fastener 10 and the sheet material 12 by retaining the sheet material in indentation formed in both the rim 40 and the center section 24 of the fastener. Thus, the recess 48 in the fastener is provided with radially outwardly projecting indentations 64 which extend into the rim 40 of the fastener 10 and radially inwardly projecting indentations 84 which extend into the center section 24 of the fastener. Additional holding action is obtained between the fastener and the sheet material by providing the center section 24 with an axially outwardly flaring side surface 54.

What is claimed is:

1. A method of mounting a fastener having a center section with circumferentially spaced indentations located inwardly from a leading end of the center section, the center section projecting from a head section, said method comprising the steps of resiliently stretching a piece of sheet material independently of any force transmitted from the fastener to the sheet material, engaging the sheet material with the leading end of the center section of the fastener while the sheet material is stretched, cutting away a circular portion of the sheet material with the center section of the fastener to form an opening having a circular edge portion in the sheet material while the sheet material is stretched, and, thereafter, terminating said step of stretching the sheet material with at least a portion of the center section of the fastener in the opening to allow the circular edge portion of the opening in the sheet material to spring back into the circumferentially spaced indentations in the center section.

2. A method as set forth in claim 1 further including the steps of resiliently contracting the leading end of the center section of the fastener inwardly in a direction transverse to a central axis of the fastener to reduce the cross sectional size of the leading end of the center section of the fastener in a plane extending transversely to the central axis of the fastener and subsequently releasing the leading end of the center section of the fastener to allow it to resiliently expand outwardly and press the indentations against the circular edge portion of the opening after terminating said step of stretching the sheet material.

3. A method as set forth in claim 1 further including the steps of resiliently expanding at least a portion of the head section of the fastener outwardly in a direction transverse to a central axis of the fastener to increase the cross sectional size of the head section of the fastener in a plane extending transversely to the central axis of the fastener and subsequently releasing the head section of the fastener to allow it to resiliently contract inwardly after terminating said step of stretching the sheet material.

4. A method as set forth in claim 1 wherein the head section of the fastener includes a rim portion which at least partially defines a recess, said method further including the steps of providing a die having a circular outer side surface with a diameter which is less than a minimum cross sectional dimension of the recess by an amount which is less than twice the thickness of the sheet material and forcing both the sheet material and the outer side surface of the die into the recess with the sheet material overlapping diametrically opposite portions of the outer side surface of the die.

5. A method as set forth in claim 1 wherein said step of stretching the piece of sheet material includes the step of engaging the piece of sheet material with a member which extends through a central portion of the fastener.

6. A method as set forth in claim 1 further including the step of forcing the sheet material into indentations formed in the center section of the fastener.

7. A method as set forth in claim 6 further including the step of forcing sheet material into indentations formed in the head section of the fastener simultaneously with performance of said step of forcing the sheet material into indentations in the center section of the fastener and after performing said step of cutting away a portion of the sheet material.

8. A method as set forth in claim 1 wherein said step of resiliently stretching the sheet material includes the step of applying a force against an area of the sheet material which is in axial alignment with the center section of the fastener, said step of cutting away a portion of the sheet material including the step of cutting the sheet material along a line which circumscribes the area of the sheet material against which a force is applied to stretch the sheet material, said step of terminating the stretching of the sheet material being performed after initiation of said step of cutting away a portion of the sheet material.

9. A method as set forth in claim 1 further including the steps of providing a die having an opening and positioning the sheet material across the opening in the die, said step of stretching the sheet material including the step of applying a force against the portion of the sheet material which extends across the opening in the die independently of any force transmitted from the fastener to the sheet material, said step of cutting away a portion of the sheet material including moving the center section of the fastener into the opening in the die, said step of cutting away a portion of the sheet material being initiated while performing said step of applying a force against the portion of the sheet material which extends across the opening in the die.

10. A method of mounting a fastener having a center section with circumferentially spaced indentations located inwardly from a leading end of the center section, the center section projecting from a head section, said method comprising the steps of providing a die having an opening with a minimum crosswise dimension which is less than a maximum cross sectional dimension of a center section of the fastener, engaging a first side of a piece of sheet material with the leading end of the center section of the fastener, engaging a second side of the piece of sheet material with the die, cutting away a circular portion of the sheet material by moving the leading end of the center section of the fastener through the sheet material into the opening in the die to form an opening having a circular edge portion, elastically decreasing the maximum cross sectional dimension of the leading end of the center section of the fastener as the center section of the fastener moves into the opening in the die by applying force against the leading end of the center section of the fastener with the die, engaging the center section of the fastener with the circular edge portion of the opening in the sheet material while the leading end of the center section of the fastener has a decreased cross sectional dimension and while the leading end of the center section of the fastener is disposed in the opening in the die, removing the leading end of the center section of the fastener from the opening in the die with the center section of the fastener extending through and disposed in engagement with the sheet material, and elastically increasing the cross sectional size of the leading end of the center section of the fastener as the leading end of the center section of the fastener is removed from the opening in the die to press the indentations in the center section of the fastener against the circular edge portion of the opening in the sheet material.

11. A method as set forth in claim 10 further including the step of pressing a portion of the sheet material into the opening in the die prior to performing said step of cutting away a portion of the sheet material with the center section of the fastener.

12. A method as set forth in claim 10 wherein said step of engaging the center section of the fastener with the sheet material includes the step of forcing a portion of the sheet material into a recess in the head section of the fastener by pressing against the second side of the sheet material with the die and expanding the recess under the influence of forces applied against the sheet material by the die, said method further including the step of decreasing the size of the recess in the head section of the fastener as the center section of the fastener is removed from the opening in the die.

13. A method as set forth in claim 10 further including the step of moving a member through an opening in the center section of the fastener and pressing the member against a portion of the sheet material which extends across the opening in the die prior to performance of said step of cutting away a portion of the sheet material.

14. A method as set forth in claim 10 wherein the center section of the fastener includes a sidewall having a plurality of indentations separated by a plurality of rigid sections, said step of decreasing the maximum cross sectional dimension of the center section of the fastener includes flexing the side wall at each of the indentations and moving the rigid sections of the side wall inwardly towards a central axis of the center section of the fastener.

15. A method as set forth in claim 10 wherein the head section of the fastener includes a rim having a side wall with a plurality of indentations separated by a plurality of rigid sections, said method further including the step of increasing the cross sectional size of the rim by applying force against the rim with the die and moving the rigid sections of the rim outwardly from a central axis of the center section of the fastener.

16. A method as set forth in claim 10 wherein said fastener includes an internal thread convolution which extends through the center section of the fastener, said step of decreasing the maximum cross sectional dimension of the center section of the fastener includes the step of decreasing the root diameter of the internal thread convolution, said step of increasing the cross sectional size of the center section of the fastener includes the step of increasing the root diameter of the internal thread convolution.

17. A method as set forth in claim 10 further including the step of increasing the cross sectional size of the head section of the fastener by transmitting force from the die to the head section of the fastener after having performed said step of decreasing the maximum cross sectional dimension of the center section of the fastener.

18. A method as set forth in claim 17 further including the step of decreasing the cross sectional size of the head section of the fastener prior to completion of said step of increasing the cross sectional size of the center section of the fastener.

19. A method as set forth in claim 17 further including the step of decreasing the thickness of the sheet material in an area between an outer side surface of the die and the head section of the fastener simultaneously with performance of said step of increasing the cross sectional size of the head section of the fastener.

20. A method of mounting a fastener having a head section and a shank extending axially outwardly from the head section, the head section having a rim with a plurality of indentations separated by a plurality of rigid rim sections, the shank having a plurality of axially extending indentations separated by a plurality of rigid shank sections, the rim and shank cooperating to at least partially define a recess which is disposed in the head section of the fastener, said method comprising the steps of providing a die having an inner side which forms an opening with a minimum crosswise dimension which is less than a maximum cross sectional dimension of the shank of the fastener and having an outer side with a maximum crosswise dimension which is less than a minimum crosswise dimension of the rim, engaging a first side of a piece of sheet material with the shank of the fastener, engaging a second side of the piece of sheet material with the die, cutting away a circular portion of the sheet material to form a circular opening in the sheet material by moving the shank of the fastener through the sheet material into the opening in the die, elastically decreasing the maximum cross sectional dimension of the shank of the fastener as the shank of the fastener moves into the opening in the die by applying force against the shank of the fastener with the inner side of the die to deflect the shank at each of the indentations in the shank and thereby move the rigid sections of the shank inwardly toward a central axis of the shank, forcing material around the opening in the sheet material into the recess in the head section of the fastener with the die as the shank of the fastener moves into the opening in the die, elastically increasing the crosswise dimension of the rim of the fastener as the sheet material is forced into the recess in the head section of the fastener by applying force against the rim of the fastener with the sheet material to elastically deflect the rim at each of the indentations in the rim and to move the rigid sections of the rim outwardly from the central axis of the shank, engaging the shank of the fastener with the sheet material while the shank of the fastener has a decreased cross sectional dimension and while the rim of the fastener has an increased crosswise dimension, thereafter, removing the shank of the fastener from the opening in the die, and elastically increasing the cross sectional size of the shank and elastically decreasing the crosswise dimension of the rim of the fastener as the shank of the fastener is removed from the opening in the die to firmly grip the sheet material in the recess in the head section of the fastener with the indentations in the rim and shank of the fastener.

21. A method as set forth in claim 20 further including the step of decreasing the thickness of the sheet material in an area between the outer side of the die and the rim of the fastener simultaneously with performance of said step of increasing the crosswise dimension of the rim of the fastener.

22. A method as set forth in claim 21 further including the step of stretching the sheet material by pressing a portion of the sheet material into the opening in the die prior to performing said step of cutting away a portion of the sheet material.

* * * * *

UNITED STATES PATENT AND TRADEMARK OFFICE
CERTIFICATE OF CORRECTION

PATENT NO. : 4,389,766
DATED : June 28, 1983
INVENTOR(S) : Capuano

It is certified that error appears in the above-identified patent and that said Letters Patent are hereby corrected as shown below:

Column 14, line 17, before "the" (first occurrence), insert --decreasing--.

Signed and Sealed this

Thirtieth Day of August 1983

[SEAL]

Attest:

GERALD J. MOSSINGHOFF

Attesting Officer

Commissioner of Patents and Trademarks